June 21, 1955  C. HAUTIER  2,711,265
PRESSURE COOKERS
Filed June 4, 1951  3 Sheets-Sheet 3
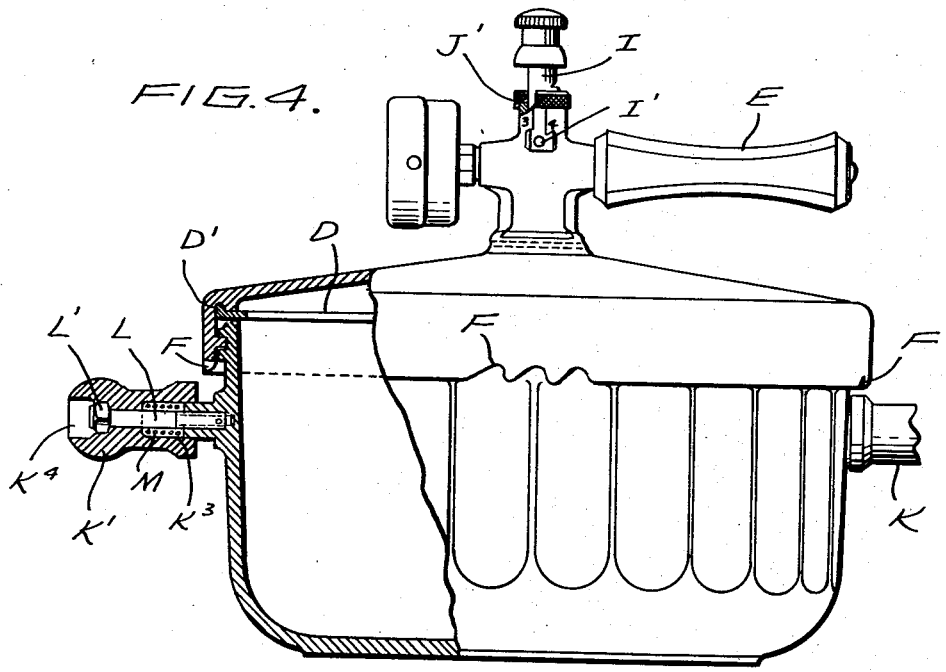
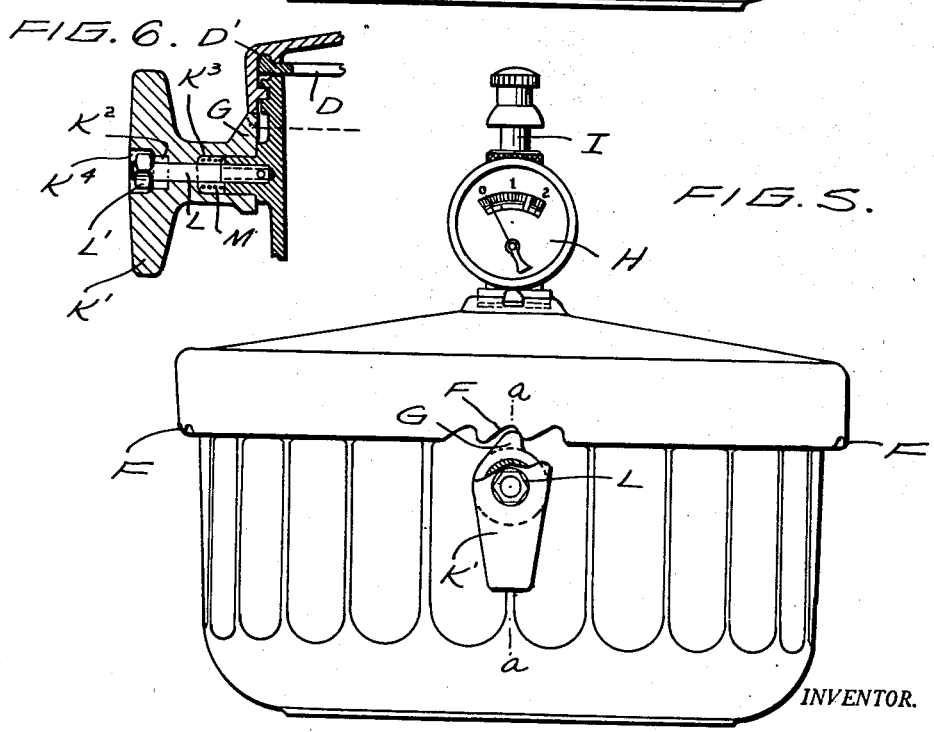
INVENTOR.
BY Camille Hautier
Michael S. Striker
agt.

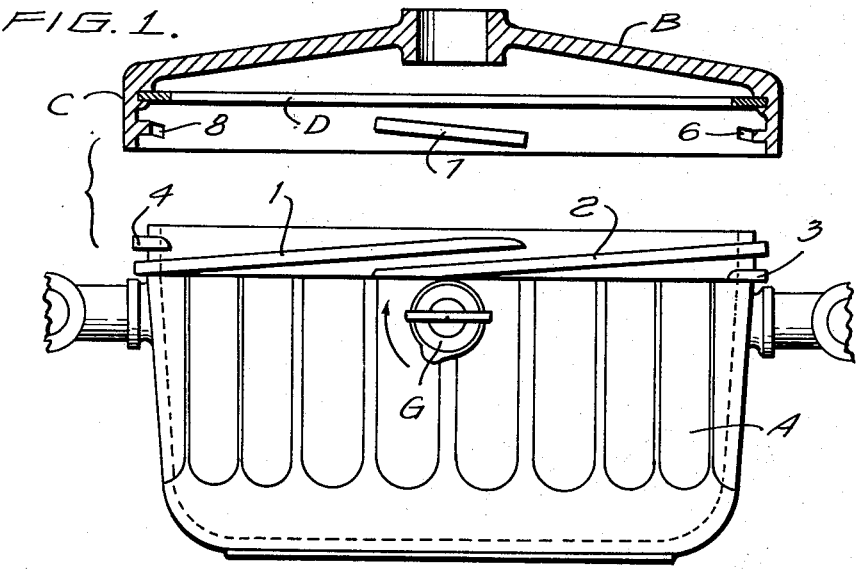
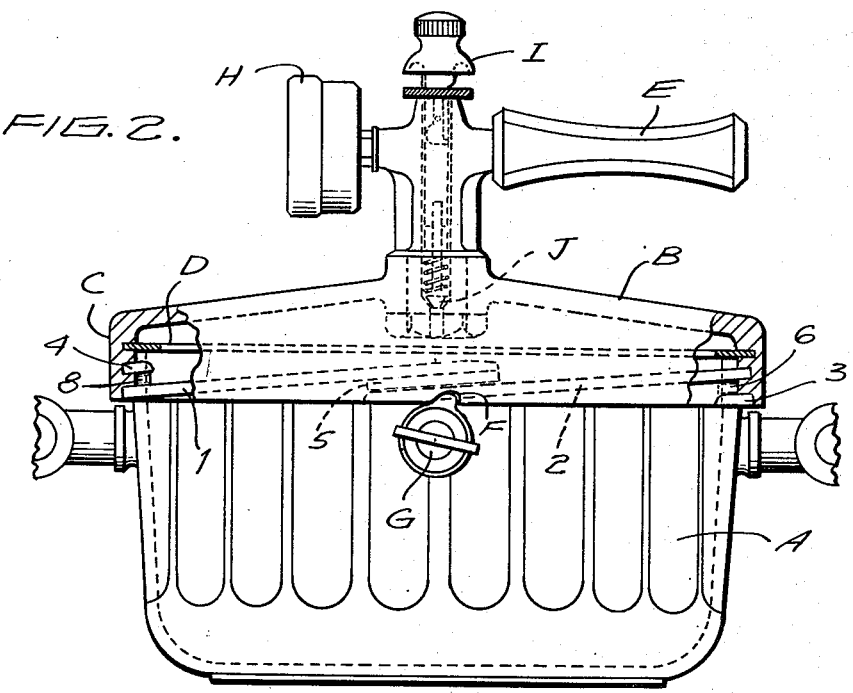

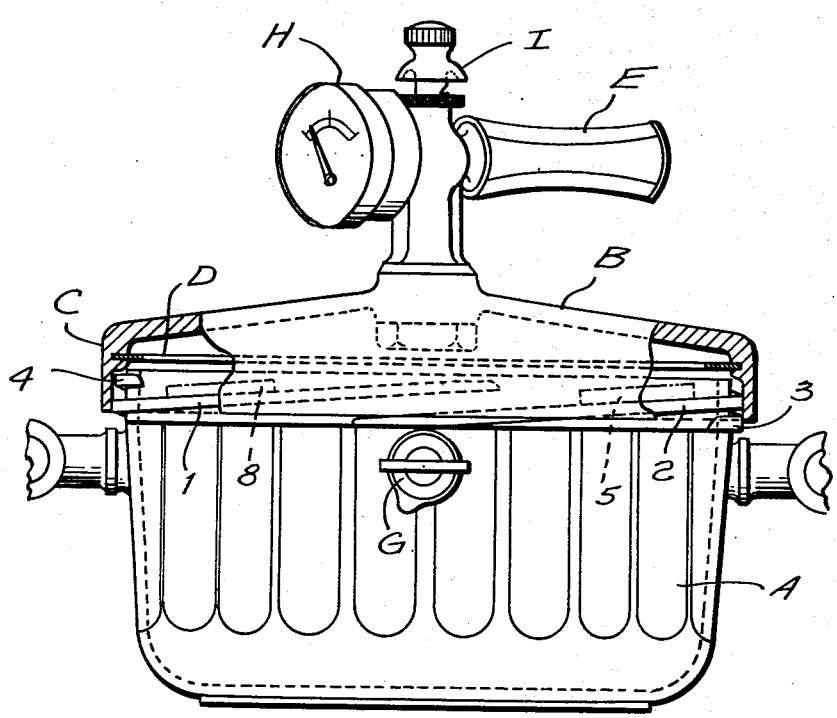

UNITED STATES PATENT OFFICE 2,711,265

PRESSURE COOKERS

Camille Hautier, Boulogne-sur-Seine, France

Application June 4, 1951, Serial No. 229,695

3 Claims. (Cl. 220—40)

The present invention relates to a pressure cooker particularly intended for use in the cooking of foods generally, such cooker, in addition to being provided with all the parts necessary for the correct functioning of apparatus in which gas, more especially steam, is generated under pressure, also offers to the user great simplicity of operation and absolute security against bursting, or the escape of hot water or steam.

The improved cooker, the exterior of which may be ribbed or grooved, is extremely simple and economical both to manufacture and maintain in condition, and provides the maximum of resistance to internal pressure with the minimum quantity of material to be heated, and has a considerable advantage over pressure cookers hitherto known, and particularly those cookers or casseroles that have bayonet-type closures, due to its new method of helicoidal closure employing one or several helical threads.

The accompanying drawings show by way of example, one constructional form of the improved cooker.

In the said drawings,

Figure 1 is an elevation of the outside of the body of the cooker, and spaced apart therefrom is a partial sectional view of the lid or cover thereof.

Figure 2 is an elevation showing the body of the cooker and its cover assembled together, the cover being in its position in which the body of the cooker is sealed.

The cover member is provided on the upper part thereof with mechanism for the control and operation thereof forming a unit comprising:

(a) An indicator showing accurately the temperatures and pressures obtained within the cooker, (b) An alarm which controls the pressure, (c) An automatic safety escape valve permitting excess pressure to be progressively reduced.

(d) A handle for use in opening and closing the cover of the cooker; all these controlling and operating members being assembled in a single unit of very light weight, which occupies only a very small space.

Figure 3 is a view similar to Figure 2, in which the cover although in position upon the cooker, is not in its sealing position, being removed through an angle of about forty five degrees with respect to its position shown in Figure 2.

Figure 4 is an elevation, with part in section, of the outside of a modified form of cooker.

Figure 5 is a view taken at an angle of ninety degrees from that at which Figure 4 is taken.

Figure 6 is a part sectional view of the line *a—a* of Figure 5.

The improved cooker, as shown in the drawings, comprises essentially a body A, preferably externally fluted, made from a light metal which has a high thermal conductivity, or of a suitable similar alloy; this body is provided exteriorly on its upper part with one or preferably several helical screw threads of suitable pitch. In the example shown, these threads are four in number 1, 2, 3 and 4, the end of each thread overlapping the starting portion of the preceding thread.

On the body A there is placed a cover B which closes it; this cover comprises a turned down rim C, which centres itself on and surrounds the upper part of the body and is provided internally with four sectors 5, 6, 7, 8, equally spaced from one another and having an inclination corresponding to that of the helicoidal threads 1, 2, 3, 4 of the body.

These sectors, when the cover is put in place on the body, by rotation of the cover on the body in order to effect the hermetical closure of the cooker, occupy relatively to the threads on the body two extreme positions corresponding to the two operations necessary to effect this closure, as will be explained hereinafter.

The cover comprises a flexible circular piece of packing D, of India rubber for example, introduced into a recess in the rim C, Figures 1 to 3.

In the modification shown in Figure 4, the packing again formed by a circular band D comprises at its outer periphery a flange D' formed in the moulding thereof and extending upwards at an angle of 90° relatively to the main plane of the packing, the said flange D' engaging in an annular groove of corresponding profile formed in the cover. This method of mounting has more especially the advantage of withdrawing the packing from the abnormal shrinkages produced by the succession of elevated temperatures involved in its being rapidly put out of use. The introduction into place of this packing can be effected without exerting force and without any special tool.

The closure of the cooker is effected as follows:

*First operation.*—The sectors 5, 6, 7 and 8 of the cover are caused to rest on the projections formed by the threads 1, 2, 3, 4 on the body; in this position, which is that shown in Figure 3, the packing D does not yet rest on the upper edge of the body.

*Second operation.*—This consists in effecting a rotary movement (of about 45°) of the cover B on the body A by the aid of the handle E; in this movement the sectors of the cover engage in the path formed between two corresponding consecutive threads on the body; this rotation is continued until the flexible packing D comes to rest on the upper edge of the body as indicated by the parts in section of the cover shown in Figure 2.

After this second operation, the flexible packing D for rendering the joint fluidtight, bears over the whole circumference of the upper edge of the apparatus and the desired internal pressure rises rapidly under the action of the heating provided. When the food is cooked and the pressure has fallen to zero, reverse operation of the handle E produces a very short sliding movement of the four projecting sectors of the cover, which rise sliding on the surface of the upper side of each of the helicoidal threads on the body, thus suppressing almost instantaneously any adherence of the packing on the upper edge of the cooker; this new arrangement shelters the user completely from any hot water or steam that might otherwise be shot out on to the user when the apparatus is opened. Moreover a notch F, which is formed in the lower edge of the cover and into which there can extend a projection or cam G mounted on the body of the apparatus, as shown for example in Figure 2, permits the contact of the packing with the upper edge of the apparatus to be broken almost instantaneously, and consequently enables the internal pressure to be equated with the atmospheric pressure.

In the modification shown in Figures 4 to 6, the body of the apparatus is provided with two handles arranged diametrically opposite to one another, viz. a fixed handle K and another K¹, which has two functions; this handle K¹ can be kept fixed and constitute one of the handling and operating members of the cooker, and it can moreover be rendered movable about its axis and serve to cause the cover to slide on the body, bringing about the detachment of the packing from the surface of body with which it is in contact and facilitating the opening of the apparatus.

This handle K¹ is bored axially forming a passage comprising various seats or recesses; it is arranged on a stud shaft L fixed on the body of the apparatus; this shaft terminates in a head L' with six flats which is adapted to engage in a recess K² of corresponding form and dimensions formed in the axial passage; a helical spring M, which surrounds the shaft L and is arranged in another recess K³ in the axial passage, continuously presses against the handle, thus forcing the recess K² into engagement with the head L' with six flats; the handle K¹ is thus rendered immovable, which is the position shown in Figure 4.

In order to employ the other function of this handle K¹, it is only necessary to push it back on its shaft L, so as to compress the spring M. By this movement the head L' is disengaged from its recess K² and stands in an axial recess K⁴ of larger cross section; the handle is then released and can be turned as desired on the shaft L.

The said handle is provided, at its end adjacent the body of the apparatus, with a tooth or cam G which, when the handle is turned on its shaft L, whilst maintaining the pressure thereon which disengages the handle L' from the recess K², engages in one of the notches F formed on the flange of the cover; this is the position shown in Figures 5 and 6. Thus, by means of this handle, which may be termed a safety key handle, the operator can, almost without effort, draw the whole cover in the direction of opening the apparatus, separately or conjointly with the cover-handle E.

The number of notches F is only given by way of example in the drawing; these notches can be arranged in four groups corresponding to the groups of sectors on the cover, which permits the cover to be placed in four different positions relatively to the body.

The unit comprising all the handling and operating members is composed of the handle E of the cover, the pressure and temperature indicator H, the pressure alarm I, and the automatic escape and safety valve J, which permits the said valve to be maintained at every instant separated from its seat. This escape valve is integral with a spur I', which can remain hooked in an annular groove J', thus enabling the internal pressure of the apparatus to be equated with the atmospheric pressure.

The pressure controlling alarm I constructed for a predetermined maximum pressure, is arranged to act in synchronism with the safety escape valve J, and calls the attention of the user at the same time as the said escape valve operates.

The safety escape valve J is designed in such a manner that it permits the predetermined excess maximum pressure rises to escape in synchronism with the corresponding pressure of the pressure indicator.

Finally the handle E serves to handle the cover in opening and closing the apparatus.

I claim:

1. A pressure cooker comprising, in combination, an open top vessel having on its outer side surface adjacent the top thereof a plurality of identical, equally spaced helical threads each of which has a top free end portion located opposite and extending parallel to an adjacent thread to form with the same a helical channel having an open end adjacent the top of said vessel; a cover adapted to be mounted on said vessel for closing the same and having, on its inner surface, a plurality of spaced, helical elongated ribs having a width substantially equal to that of said channels and being located within the latter when said cover is mounted on said vessel so that by turning of said cover and vessel with respect to each other said ribs may be moved in opposite directions in said channels to connect and disconnect the cover from said vessel, whereby said cover moves toward and away from said vessel during closing and opening of the latter, respectively, said cover being formed with at least one notch extending into the same from the bottom edge thereof; an annular sealing ring made of a resilient sheet material, being fixed to the interior of said cover, extending about the latter, and having an inner, free, annular edge portion resting against the top end of said vessel about the periphery thereof when said cover is in its closing position on said vessel so that the pressure within the latter presses said free, inner, annular edge portion of said sealing ring against said vessel to seal the latter; an elongated rod fixed at one end to the outside of said vessel adjacent the top thereof and extending therefrom; a tubular handle slidably mounted on said rod for movement toward and away from said vessel; and a cam fixed to the inner end of said handle to be movable with the same toward and away from said vessel and into and out of said notch of said cover so that when said cam is in said notch said handle may be turned to turn said cover to facilitate the removal thereof from said vessel and thereby separate said sealing ring from said vessel.

2. A pressure cooker comprising, in combination, an open top vessel having on its outer side surface adjacent the top thereof a plurality of identical, equally spaced helical threads each of which has a top free end portion located opposite and extending parallel to an adjacent thread to form with the same a helical channel having an open end adjacent the top of said vessel; a cover adapted to be mounted on said vessel for closing the same and having, on its inner surface, a plurality of spaced, helical elongated ribs having a width substantially equal to that of said channels and being located within the latter when said cover is mounted on said vessel so that by turning of said cover and vessel with respect to each other said ribs may be moved in opposite directions in said channels to connect and disconnect the cover from said vessel, whereby said cover moves toward and away from said vessel, during closing and opening of the latter, respectively, said cover being formed with at least one notch extending into the same from the bottom edge thereof; an annular sealing ring made of a resilient sheet material, being fixed to the interior of said cover, extending about the latter, and having an inner, free, annular edge portion resting against the top end of said vessel about the periphery thereof when said cover is in its closing position on said vessel so that the pressure within the latter presses said free, inner, annular edge portion of said sealing ring against said vessel to seal the latter; an elongated rod fixed at one end to the outside of said vessel adjacent the top thereof and extending therefrom; a tubular handle slidably mounted on said rod for movement toward and away from said vessel; a cam fixed to the inner end of said handle to be movable with the same toward and away from said vessel and into and out of said notch of said cover so that when said cam is in said notch said handle may be turned to turn said cover to facilitate the removal thereof from said vessel and thereby separate said sealing ring from said vessel; and resilient means engaging said handle to urge the same away from said vessel.

3. A pressure cooker comprising, in combination, an open top vessel having on its outer side surface adjacent the top thereof a plurality of identical, equally spaced helical threads each of which has a top free end portion located opposite and extending parallel to an adjacent thread to form with the same a helical channel having an open end adjacent the top of said vessel; a cover adapted to be mounted on said vessel for closing the same and having, on its inner surface, a plurality of spaced, helical elongated ribs having a width substantially equal to that of said channels and being located within the latter when said cover is mounted on said vessel so that by turning of said cover and vessel with respect to each other said ribs may be moved in opposite directions in said channels to connect and disconnect the cover from said vessel, whereby said cover moves toward and away from said vessel during closing and opening of the latter, respectively, said cover being formed with at least one notch extending into the same from the bottom edge thereof; an annular sealing ring made of a resilient sheet material, being fixed to the interior of said cover, extending about the latter, and having an inner, free, annular edge portion resting against the top end of said vessel about the periphery thereof when said cover is in its closing position on said vessel so that the pressure within the latter presses said free, inner, annular edge portion of said sealing ring against said vessel to seal the latter; an elongated rod fixed at one end to the outside of said vessel adjacent the top thereof and extending therefrom; a tubular handle slidably mounted on said rod for movement toward and away from said vessel, said handle being formed with a non-circular opening at the outer end thereof distant from said vessel; a cam fixed to the inner end of said handle to be movable with the same toward and away from said vessel and into and out of said notch of said cover so that when said cam is in said notch said handle may be turned to turn said cover to facilitate the removal thereof from said vessel and thereby separate said sealing ring from said vessel; resilient means engaging said handle to urge the same away from said vessel; and a non-circular member fixed to the outer end of said rod and being located in said non-circular opening of said handle when said cam is out of said notch to prevent rotation of said handle and to limit the movement thereof from said vessel.

References Cited in the file of this patent

UNITED STATES PATENTS

| 1,443,682 | Gueritey | Jan. 30, 1923 |
| 1,834,837 | Hashimoto | Dec. 1, 1931 |
| 2,039,037 | Simpson | Apr. 28, 1936 |
| 2,218,188 | Wittenberg | Oct. 15, 1940 |
| 2,334,448 | Sheridan | Nov. 16, 1943 |
| 2,513,458 | Dion | July 4, 1950 |
| 2,540,583 | Ives | Feb. 6, 1951 |

FOREIGN PATENTS

| 261,370 | Great Britain | Apr. 14, 1927 |
| 524,941 | Great Britain | Aug. 19, 1940 |